(12) United States Patent
Chang et al.

(10) Patent No.: US 9,785,151 B1
(45) Date of Patent: Oct. 10, 2017

(54) MACHINE AND NAVIGATION CONTROL STRATEGY INCLUDING VELOCITY CALCULATION

(71) Applicant: Caterpillar Inc., Peoria, IL (US)

(72) Inventors: Hong Chang, Peoria, IL (US); Nicholas Vogel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/078,565

(22) Filed: Mar. 23, 2016

(51) Int. Cl.
*G05D 1/02* (2006.01)
*G05D 1/00* (2006.01)

(52) U.S. Cl.
CPC .......... *G05D 1/027* (2013.01); *G05D 1/0088* (2013.01)

(58) Field of Classification Search
CPC ........ G05D 1/027; G05D 1/0088; F16H 7/14; B01F 11/0011; B64G 1/285; B62D 11/003; B60T 8/172
See application file for complete search history.

(56) References Cited

U.S. PATENT DOCUMENTS

| | | | |
|---|---|---|---|
| 2,556,259 A * | 6/1951 | Dorris | F16H 7/14 474/109 |
| 3,332,668 A * | 7/1967 | Walker | B01F 11/0011 366/212 |
| 4,809,794 A | 3/1989 | Blair et al. | |
| 5,784,029 A | 7/1998 | Geier | |
| 6,225,574 B1 | 5/2001 | Chang et al. | |
| 6,934,616 B2 | 8/2005 | Colburn et al. | |
| 8,271,229 B2 | 9/2012 | Hsu et al. | |
| 8,660,758 B2 | 2/2014 | Janardhan et al. | |
| 8,909,437 B2 | 12/2014 | Zhu et al. | |
| 9,157,216 B2 | 10/2015 | Seki | |
| 2009/0183951 A1* | 7/2009 | Fiala | B64G 1/285 185/27 |
| 2011/0160963 A1* | 6/2011 | Yasui | B62D 11/003 701/41 |
| 2011/0219893 A1* | 9/2011 | Fiala | B64G 1/285 74/5.34 |
| 2013/0151086 A1* | 6/2013 | Shockency, Jr. | B60T 8/172 701/50 |
| 2013/0304321 A1* | 11/2013 | Takenaka | B62D 11/003 701/41 |

* cited by examiner

*Primary Examiner* — Yuri Kan
(74) *Attorney, Agent, or Firm* — Jonathan F. Yates; Timothy A. Parker

(57) ABSTRACT

A machine navigation system includes a monitoring mechanism for monitoring configuration of an implement movable between configurations relative to a frame such that a center of mass of the machine moves in response to the moving of the implement. A second monitoring mechanism monitors track speed in the machine. A location of an origin of the track speed varies based upon location of the center of mass. A control unit is coupled with the monitoring mechanisms and structured to determine a control term for compensating for movement of a reference location on the machine relative to the track speed origin. The control unit further calculates velocity based on the track speed and the compensatory control term.

20 Claims, 4 Drawing Sheets

US 9,785,151 B1

MACHINE AND NAVIGATION CONTROL STRATEGY INCLUDING VELOCITY CALCULATION

TECHNICAL FIELD

The present disclosure relates generally to machine navigation, and more particularly to compensating for a dynamic lever arm in calculating machine velocity.

BACKGROUND

Autonomous machines operate with little or no input from a human operator. In general terms, autonomous machines observe various parameters relating to machine state, operating environment, and external data sources such as global or local positioning systems, and render decisions as to machine travel, implement control and operation, and still other functions and properties. It is common for such machines to include redundant or semi-redundant systems for monitoring various parameters of interest to mitigate failure or performance degradation of one of the systems, or simply for the purpose of optimizing accuracy or precision.

Navigation systems in particular on autonomous machines commonly include redundant components. Global positioning systems and other Global Navigation Satellite Systems (GNSS) can provide a data source for determining machine position with relatively high accuracy and precision but have certain shortcomings, notably at least occasional unavailability due to certain topographic features or weather conditions. Odometry systems, inertial measurement units and other systems are often provided to serve as supplements to satellite-based systems or as backups in the event of unavailability or failure thereof. Commonly owned United States Patent Application No. 2016/0017703 to Friend is directed to a Drill Positioning System Utilizing Drill Operation State. Friend apparently utilizes data from various sources to navigate a drill machine and position its drill for operation.

SUMMARY

In one aspect, a machine includes a frame, ground engaging propulsion elements coupled to the frame, and an implement. The implement is movable relative to the frame from a first configuration where a center of mass of the machine is at a first location to a second configuration where the center of mass is at a second location. A first monitoring mechanism produces an output indicative of the configuration of the implement. The machine further includes a second monitoring mechanism producing an output indicative of a speed of at least one of the ground engaging propulsion elements. The machine further includes a control unit coupled with the first monitoring mechanism and structured to determine a compensatory control term responsive to the output of the first monitoring mechanism. The control unit is further coupled with the second monitoring mechanism and structured to calculate a velocity of the machine at a reference location upon the machine, responsive to the output of the second monitoring mechanism and to the compensatory control term.

In another aspect, a navigation system for a machine includes a first monitoring mechanism structured to couple with an implement of the machine movable between a first configuration and a second configuration relative to a frame of the machine and to produce an output indicative of the configuration of the implement. A location of a center of mass of the machine varies dependent upon the configuration of the implement. The navigation system further includes a second monitoring mechanism structured to couple with ground engaging elements of the machine and to produce an output indicative of a speed of at least one of the ground engaging elements. A control unit is coupled with the first monitoring mechanism and structured to determine a compensatory control term responsive to the output of the first monitoring mechanism. The control unit is further coupled with the second monitoring mechanism and structured to calculate a velocity of the machine at a reference location upon the machine responsive to the output of the second monitoring mechanism, and responsive to the compensatory control term.

In still another aspect, a method of navigating a machine includes receiving data indicative of a speed of a ground engaging element of the machine, and receiving data indicative of a configuration of an implement of the machine movable relative to a frame of the machine such that a location of a center of mass of the machine is moved relative to the frame. The method further includes determining a velocity of the machine responsive to the control term and to the data indicative of speed, and commanding a change to at least one of a ground speed and a travel direction of the machine responsive to the calculated velocity.

DETAILED DESCRIPTION

Figure 1:
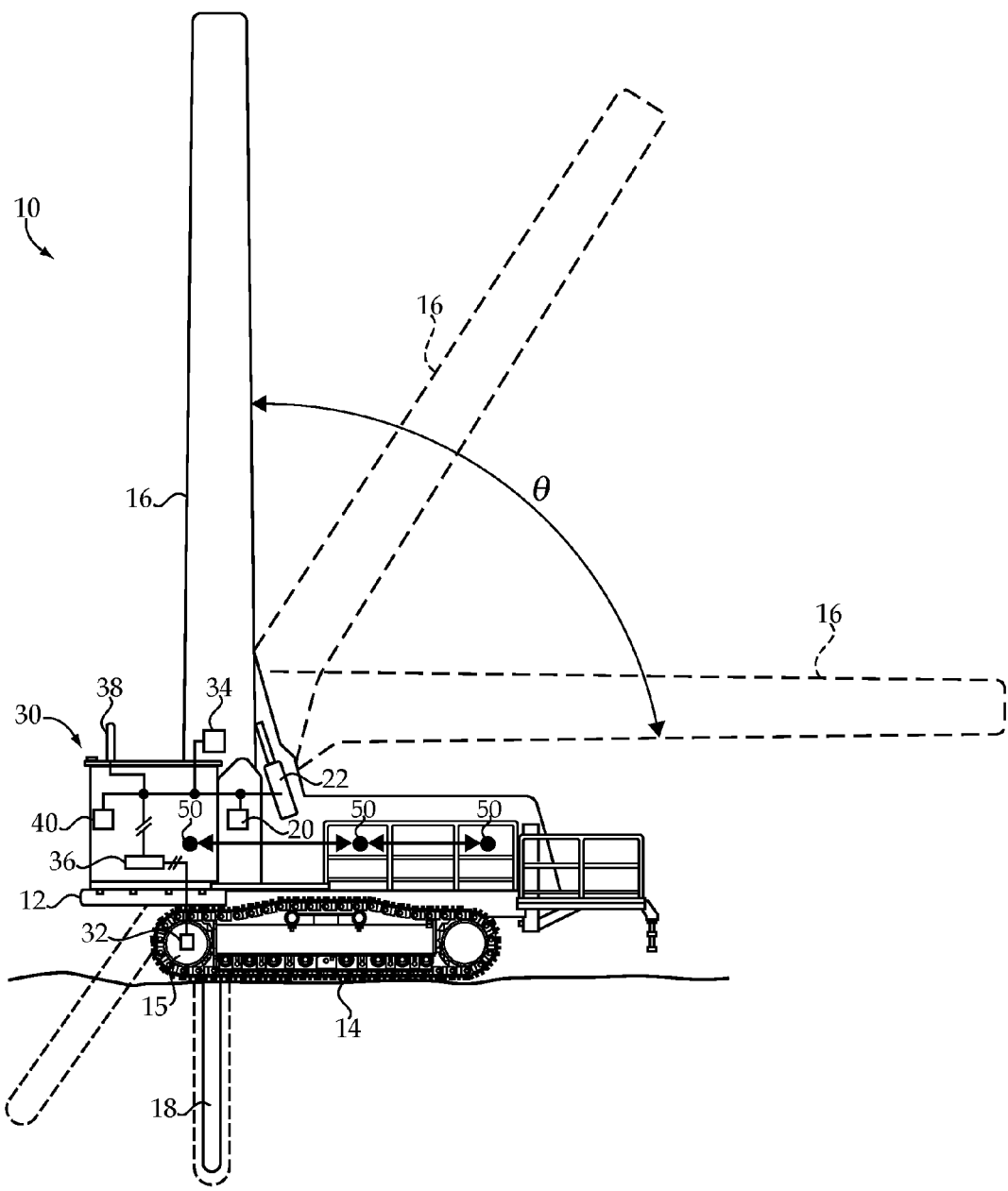
FIG. 1 is a side diagrammatic view of a machine, according to one embodiment.

Referring to FIG. 1, there is shown a machine 10 including a frame 12 and ground engaging propulsion elements 14. In a practical implementation strategy, ground engaging elements 14 include a first track 14 as shown in FIG. 1, positioned at a first side of frame 12, and a second track positioned at an opposite side of frame 12 and hidden from view in the FIG. 1 illustration. Machine 10 further includes an implement 16 movable relative to frame 12 from a first configuration where a center of mass 50 of machine 10 is at a first location, to a second configuration where center of mass 50 is at a second location. Implement 16 may be movable through a range of configurations, each of which is associated with a different location of center of mass 50. Moving of center of mass 50 may be translation of center of mass 50 in a generally fore-to-aft linear direction, although center of mass 50 may also move vertically or side-to-side depending upon machine type as further discussed herein. In FIG. 1 implement 16 is shown at the first or raised, vertical position in solid lines, and at each of a partially lowered and a fully lowered, horizontal position in phantom lines. Implement 16 may include an arm pivotable relative to frame 12, and in the nature of a drill mast in the illustrated embodiment, with its range of motion restricted to pivoting in a single plane. In other embodiments an implement could be movable according to multiple degrees of freedom as further discussed herein.

Machine 10 may further include apparatus for driving ground engaging elements 14, including a drive sprocket 15 coupled with an engine and drivetrain in a conventional manner. An actuator 22, such as a hydraulic actuator, may be coupled between frame 12 and implement 16 so as to controllably raise and lower implement 16. Another actuator 34 may be provided for operating implement 16. In the example of a drill, actuator 34 may include a rotary actuator structured to rotate a drill bit 18 in a conventional manner. As will be further apparent from the following description machine 10 may be uniquely structured for autonomous operation of implement 16 and drill 18, and autonomous navigation even in the event of failure or unavailability of parts of on-board navigation equipment.

To this end, machine 10 may also include a navigation system 30 that includes a first monitoring mechanism 20 structured to couple directly or indirectly with implement 16, and producing an output indicative of the configuration of implement 16 relative to frame 12. Mechanism 20 could include a linear position sensor, a rotary potentiometer, a camera, or any other suitable apparatus that can provide a signal or a state for interrogation that indicates where or approximately where within a range of motion implement 16 is located. Rather than sensing position directly those skilled in the art will contemplate various alternative strategies for determining whether implement 16 is raised, lowered, or somewhere between raised and lowered, all of which could fall within the scope of the present disclosure. Those skilled in the art will also appreciate that an implement such as implement 16 that pivots between a raised and a lowered position can be monitored relatively easily with respect to position and/or configuration, potentially with a single sensor. Other implement and machine types such as a boom and bucket, an extensible telehandler, and many others exist where possible implement configurations are more complex and are best monitored with multiple sensors.

Navigation system 30 may also include a second monitoring mechanism 32 structured to couple with at least one of ground engaging elements 14, and to produce an output indicative of a speed of the at least one of the ground engaging elements 14. In one practical implementation strategy, mechanism 32 includes one or more sensors coupled with any of the other rotating elements such as drive sprocket 15, an idler, carrier rollers or track rollers that support ground engaging elements 14 during operation to propel machine 10. In a further practical implementation strategy, sensors are coupled with each of the tracks at the opposite sides of frame 12 so as to enable producing an average speed output for the first track and the second track, the significance of which will be apparent from the following description. Those skilled in the art will appreciate that a wide variety of strategies might be used that are fairly considered to produce an output indicative of a speed of at least one of ground engaging elements 14.

Navigation system 30 may further include one or more external signal receivers 38 coupled with frame 12 at a fixed location and structured to receive signals from GNSS satellites or a local positioning network such as pseudolites or ranging radios, or compare features to a map with sensor information from LIDAR, or cameras, for example, and a measurement unit 40 structured to measure parameters relating to machine motion such as position, acceleration, velocity, orientation, angular rates. Those skilled in the art will be familiar with still other mechanisms and parameters of interest in the field of machine positioning and navigation that might be incorporated to navigation system 30. In a practical implementation strategy, navigation system 30 still further includes a control unit 36 having one or more computer processors and computer memory that is coupled with each of first monitoring mechanism 20, second monitoring mechanism 32, receiver 38, measurement unit 40, and actuators 22 and 34.

It will be recalled that center of mass 50 moves in response to moving of implement 16. Traction points at which ground engaging elements 14 engage the ground surface will also tend to change along with the moving of center of mass 50. A location of a point on machine 10 that continues to move straight forward during turning is dependent upon locations of the traction points and thus upon a location of center of mass 50. Where implement 16 is fully raised, center of mass 50 will tend to have a more rearward location, as shown to the left in FIG. 1, potentially located laterally between drive sprocket 15 and its counterpart drive sprocket associated with the opposite track. Where implement 16 is fully lowered center of mass 50 will tend to have a more forward location, as shown to the right in FIG. 1, located perhaps between forward idler rollers of the tracks. Where implement 16 is part way between its raised and lowered positions center of mass 50 will tend to be located part way between the rearward and forward locations as also shown in FIG. 1. The point on machine 10 that continues to move straight forward during turning may be located approximately at the same location as center of mass 50 in some instances. Pitch and roll of machine 10, if applicable in any given instance, can affect the location of the center of rotation of machine 10, and thus the location of the point that is moving straight forward at any given instant during turning. Track speed origin can be understood as the origin of a velocity vector of machine velocity. While track speed origin will not necessarily reside at the center of mass its location tends to vary based upon locations of traction points with the ground, and at any given instant track speed origin may have the same location or a location that is closely coupled with that of the point that is moving straight forward. Thus moving the center of mass moves the location of the origin of track speed.

For various purposes, including tracking machine travel distance by integrating velocity, the track speed origin serves as a useful reference point for reasons that will be apparent from the following description. For purposes of determining machine position and synthesizing machine data from multiple sources, it can be desirable to "move" the measured track speed to a different reference location. For instance, measurement unit 40 may include accelerometers and gyroscopes. For purposes of synthesizing acceleration, other velocity or orientation data with measured machine velocity data, the machine velocity calculation may use track speed data that accounts for the so called lever arm between the reference location at which acceleration and orientation are determined and the track speed origin. These principles will be further apparent in view of the following description.

Those skilled in the art of machine navigation will appreciate that determination of machine velocity depends upon the particular reference point of interest where a velocity is sought. For instance, a machine that is negotiating a turn and thus rotating in space may have one velocity at a forward edge of the machine, and another velocity at a back edge of the machine, with an angular velocity component existing between those two reference points. The angular velocity component results in movement of one reference point relative to another, which must be compensated for if velocity calculation and ultimately position determinations are to be optimally accurate. In a like manner, machine 10 will have one velocity at the track speed origin, and different velocities at other points on the machine. Given the change in location of the track speed origin based upon the change in location of center of mass 50 in response to moving implement 16, the velocity between the speed origin and any reference point on the machine can vary in response to variation in location or configuration of implement 16 based on the angular velocity. The present disclosure reflects the insight that accuracy in calculating a velocity of machine 10 at any given reference point on machine 10 other than at the track speed origin is improved if the angular velocity compensation accounts for a dynamic lever arm between the reference point and the track speed origin. Stated still another way a variable lever arm based on the position of implement 16 as measured by first monitoring mechanism 20 from the reference point of interest to the track speed origin is used rather than assuming a fixed difference in location between those two points as in certain earlier strategies.

Figure 3:
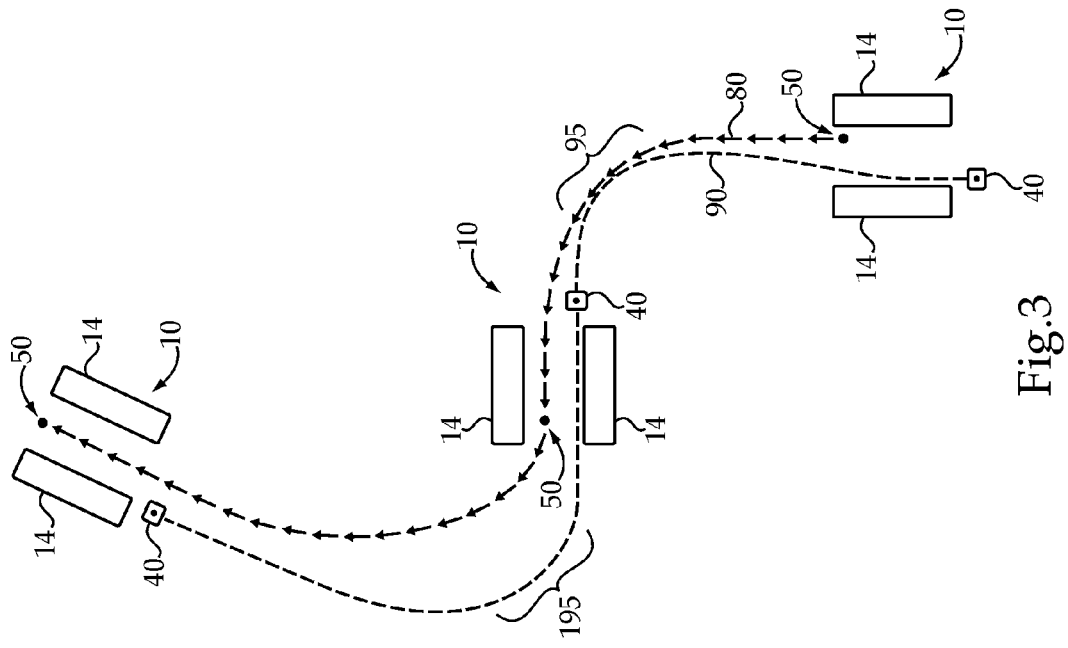
FIG. 3 is a diagrammatic illustration of properties of machine travel with a center of mass and track speed origin of the machine at a second location.
Figure 2:
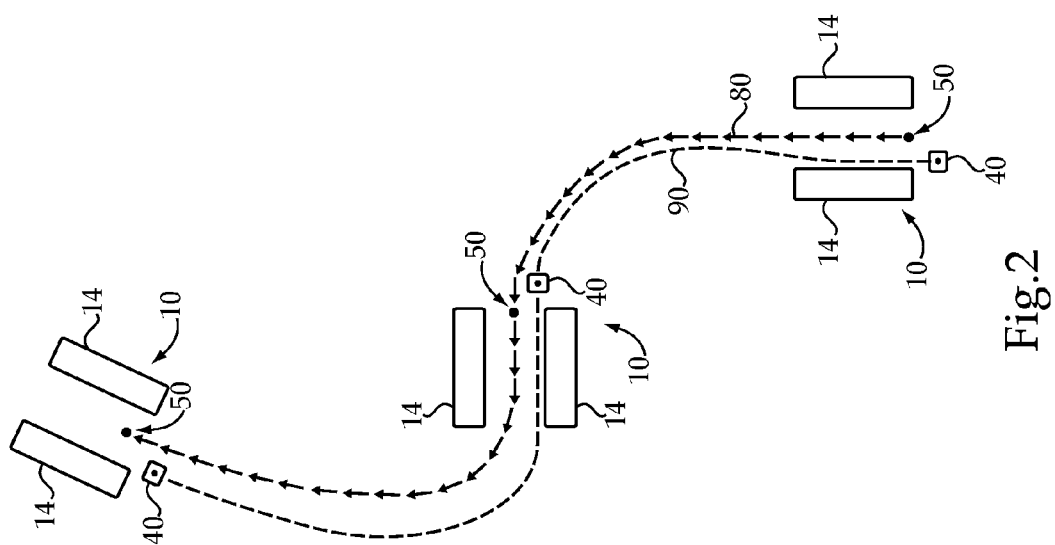
FIG. 2 is a diagrammatic illustration of properties of machine travel with a center of mass and track speed origin of the machine at a first location.

Referring also now to FIG. 2 there is shown a diagrammatic illustration of machine 10 moving through a left turn and a right turn with center of mass 50, and thus track speed origin, at a more rearward location. In the illustrated case, measurement unit 40 serves as the reference point of interest whose compensated velocity it is desirable to calculate. Reference numeral 80 identifies an approximate travel path of center of mass 50 whereas reference numeral 90 identifies an approximate travel path of measurement unit 40. Arrows in travel path 80 denote travel direction of machine 10. It can be seen that paths 80 and 90 are roughly but not perfectly parallel, and approach one another part way through the first turn, and move slightly away from one another part way through the second turn. Referring also now to FIG. 3, there is shown a diagrammatic illustration of machine 10 moving through a left turn and a right turn with center of mass 50, and thus track speed origin, at a more forward location. It will be readily apparent that the distance separating measurement unit 40 and center of mass 50 in the FIG. 2 instance is relatively lesser, whereas the distance separating measurement unit 40 and center of mass 50 in the FIG. 3 instance is relatively greater. It can also be noted that in a region 95 of the first turn negotiated by machine 10 in the FIG. 3 instance that paths 80 and 90 actually overlap, or very nearly so. In the second turn in the FIG. 3 instance, at another region 195 paths 80 and 90 veer away from one another more dramatically than in the corresponding part of the second turn in the FIG. 2 example. The different lever arms in the FIG. 2 case versus the FIG. 3 case result in differences in lateral movement of the reference point relative to center of mass 50. It will be appreciated that relative motion between paths may be other than lateral, including vertical relative motion and diagonal relative motion. Accordingly, the examples of FIG. 2 and FIG. 3 are simplified from what might be observed in many real-world examples, such as at a mine site. Practical embodiments are nevertheless contemplated where only lateral relative motion is compensated for in strategies according to the present disclosure.

Control unit 36 may further be structured to determine a compensatory control term responsive to the output of first monitoring mechanism 20. It will be recalled that mechanism 20 produces an output indicative of the configuration of implement 16, and thus control unit 36 can be provided data indicating whether implement 16 is raised, lowered, or somewhere in between. In a practical implementation strategy control unit 36 can read the compensatory control term from a map stored in computer readable memory, thus determining a lever arm or another quantity that accounts for the difference in location of the reference location and the track speed origin. Control unit 36 may further be structured to calculate a velocity of machine 10 at the reference location responsive to the output of second monitoring mechanism 32 and to the compensatory control term. Another way to understand the operations performed by control unit 36 is that track speed data is gathered and inputted to control unit 36, which processes the track speed data so as to calculate a velocity at the reference location by accounting for the rotation and lateral movement of the reference location relative to the track speed origin. In the case of the FIG. 2 example a relatively lesser lever arm means that relatively lesser rotation and lateral movement of the reference location relative to the track speed origin needs to be compensated for, whereas in the case of the FIG. 3 example a relatively greater lever arm means that relatively greater rotation and lateral movement of the reference location relative to the track speed origin needs to be compensated for.

Figure 4:
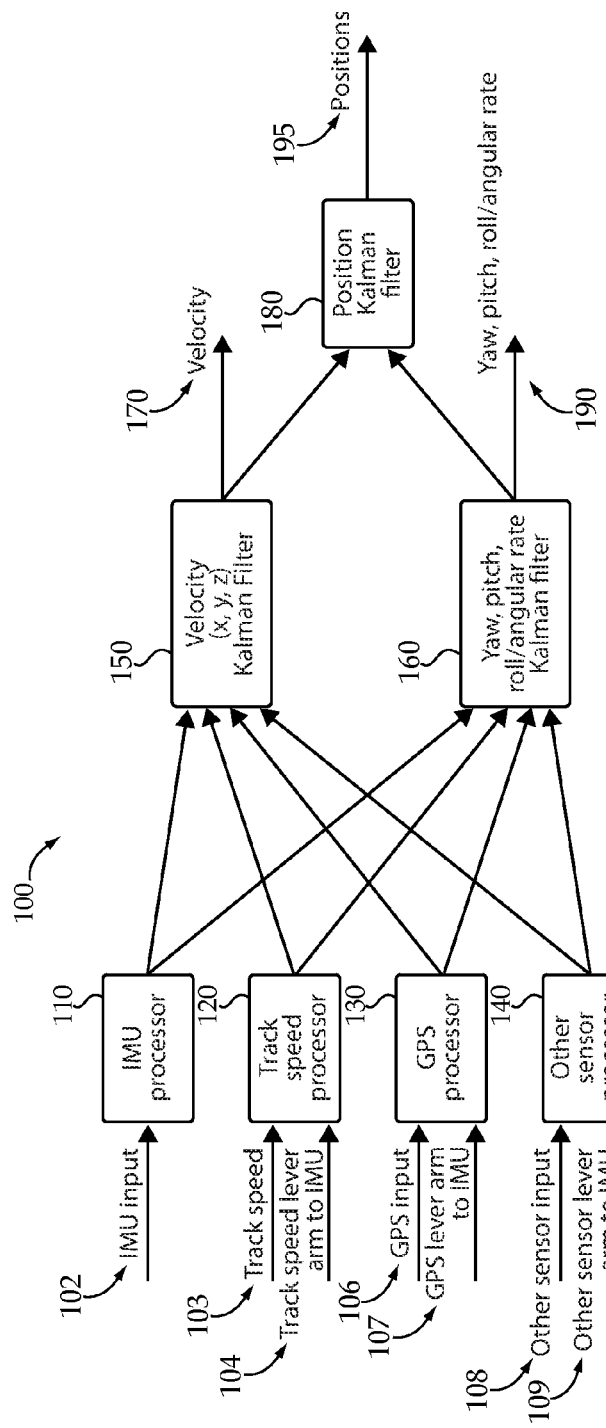
FIG. 4 is a block diagram of control features according to one embodiment.

Referring now also to FIG. 4, there is shown a block diagram 100 illustrating control features and functions of navigation system 30 according to one embodiment. Diagram 100 illustrates an inertial measurement unit (IMU) processor 110 that receives an IMU input and lever arm input 102. A track speed processor 120 receives a track speed input 103 and a track speed lever arm to IMU input 104. In contrast to prior designs, the track speed lever arm to IMU input 104 varies responsive to configuration of implement 16 as described herein. A GPS processor 130 receives a GPS input 106 and GPS lever arm to IMU input 107. Other sensor processor(s) 140 receives other sensor inputs 108 and other sensor lever arm to IMU inputs. Outputs of each of processors 110, 120, 130 and 140 are processed by way of a Kalman filter 150 so as to produce a velocity output 170. Outputs of each of processors 110, 120, 130 and 140 are also processed by way of a yaw, pitch, roll/angular rate Kalman filter 160 so as to produce a yaw, pitch and roll output(s) as well as an angular rate/bias output 190. A third Kalman filter 180 filters outputs of filters 150 and 160 as well as position information from GNSS (and/or other sensors) so as to produce a position output 195.

Figure 5:
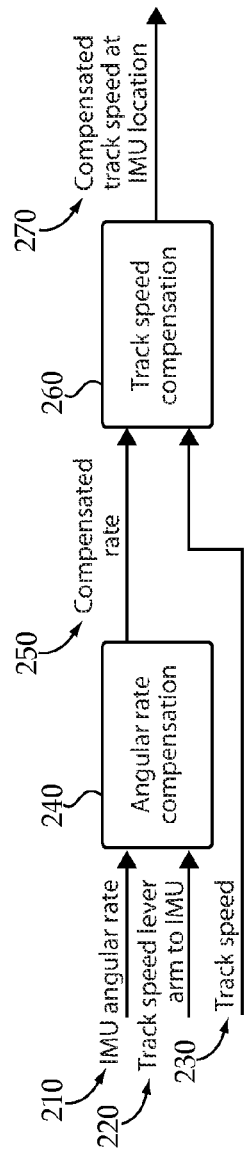
FIG. 5 is a block diagram of control features according to one embodiment.

Referring now also to FIG. 5, there is shown a block diagram illustrating control features and functions of navigation system 30 in connection with processing track speed in greater detail. An IMU angular rate input 210 and a track speed lever arm to IMU input 220, are processed in an angular rate compensation block 250 so as to produce a compensated angular rate output 250. In a track speed compensation block 260, the compensated rate 250 and a track speed input 230 are processed so as to produce a compensated track speed at IMU location output 270.

As discussed above, control unit 36 may be structured to determine a compensatory control term for calculating velocity. In a practical implementation strategy the compensatory control term includes the track speed lever arm to IMU. The track speed origin may be located at center of mass 50 or its location may be closely coupled with the location of center of mass 50. Rather than the IMU location serving as the reference location any other fixed location on or relative to machine 10 could be chosen. In any event, an example calculation of lever arm Y can be performed according to the equation:

$$Y = Y\text{min} + (Y\text{max} - Y\text{min}) * \sin(\theta)$$

where: θ=mast angle, with 0° being fully lowered and 90° being fully raised;
Ymin=lever arm while mast completely down; and
Ymax=lever arm while mast is straight up.

In a practical implementation strategy, Ymin and Ymax can be pre-set or pre-calibrated for each machine. In the case of a different machine, such as a front shovel or an excavator, a lever arm calculation may be somewhat more involved due to the possibility of rotation of the boom and bucket assembly. An equation for calculating lever arm Y in such an instance can be as follows:

$$Y = Ymin + (Ymax - Ymin) * \cos(\alpha) * \sin(\theta)$$

where: θ=boom angle, with 0° being fully lowered and 90° being fully raised;
α=rotation angle;
Ymin=lever arm while boom completely down; and
Ymax=lever arm while boom is straight up.

INDUSTRIAL APPLICABILITY

Figure 6:
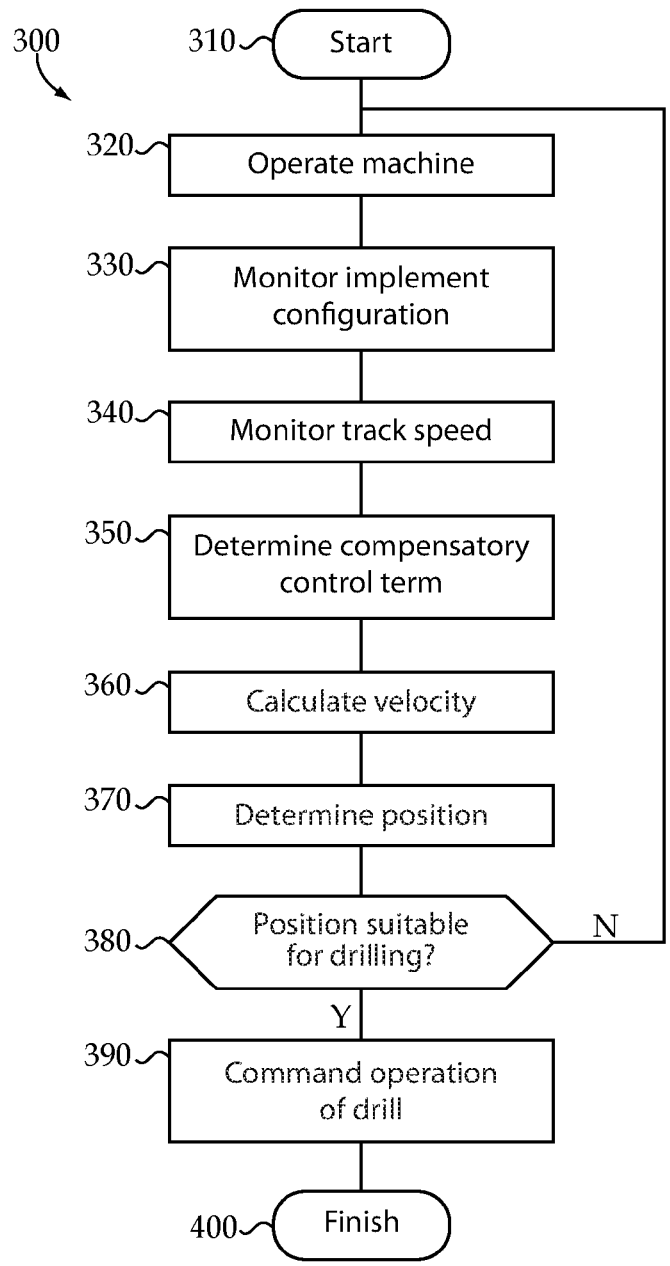
FIG. 6 is a flowchart of control logic according to one embodiment.

Referring now also to FIG. 6 there is shown a flowchart 300 illustrating example control logic flow according to the present disclosure. The logic may initialize or START at block 310, and then advance to block 320 to operate the machine such as by initiating or continuing driving the machine across a ground surface. From block 320 the logic may advance to block 330 to monitor the implement configuration, such as by way of monitoring an output of mechanism 20. From block 330 the logic may advance to block 340 to monitor track speed such as by way of monitoring an output of mechanism 32 in the manner described herein. From block 340 the logic may advance to block 350 to determine the compensatory control term, and then to block 360 to calculate velocity of the reference point. From block 360 the logic may advance to block 370 to determine position of machine such as by integrating velocity calculations, and thenceforth to block 380. At block 380 electronic control unit 36 may query whether the determined position is suitable for drilling. If no, the logic may return to execute block 320. If yes, the logic may advance to block 390 to command operation of the drill, and then to block 400 to FINISH.

Those skilled in the art of mobile machine mining drills and the like will be familiar with operations such as the drilling of a series of drill holes for the planting of explosives. One application of the present disclosure is an autonomous drill that guides itself from one drill hole location to the next at a mine site or elsewhere without input from a human operator. Accordingly, in the foregoing description of a query as to whether a determined position is suitable for drilling, electronic control unit 32 may be determining whether a machine position is at or within an acceptable tolerance of a predefined machine position for drilling one of a plurality of holes to be drilled. Electronic control unit 36 can command a change in at least one of a ground speed and a travel direction of machine 10 responsive to the calculated velocity. Electronic control unit 36 may further be structured to energize or de-energize an actuator of an implement, such as actuator 34, responsive to determined machine position, so as to rotate drill bit 18 as appropriate.

At least occasionally global positioning data from GNSS satellites can become unavailable, due potentially to weather conditions or obstruction of lines of site to satellites by features of the local terrain, or loss of accuracy can occur due to loss of recent connection information resulting from a network outage, for example. Operational disruptions in the global positioning equipment on-board a machine can of course occur as well. In many applications a machine according to the present disclosure will utilize data from all of GNSS, odometry, and inertial measurements in the course of navigation. Odometry and inertial measurements can serve as a cross check for the accuracy of GNSS, a backup in the event of GNSS unavailability, or some other synthesis of the data from the various sources can be performed. In instances where satellite-based positioning is not available or is degraded, odometry and/or inertial positioning can enable a machine to continue to operate autonomously at least for some time. Such capabilities are considered to be advantageous inasmuch as the time period during which the machine can operate without GNSS is extended. In other words, while some error in the odometry and/or inertial data will inevitably develop over time, the present disclosure enables such error to be constrained so that a machine can continue to operate within acceptable tolerances for some time until GNSS once again becomes available, or a particular duty cycle is completed.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. A machine comprising:
   a frame;
   ground engaging propulsion elements coupled to the frame;
   an implement movable relative to the frame from a first configuration where a center of mass of the machine is at a first location to a second configuration where the center of mass is at a second location;
   a first monitoring mechanism producing an output indicative of the configuration of the implement;
   a second monitoring mechanism producing an output indicative of a speed of at least one of the ground engaging propulsion elements;
   a control unit coupled with the first monitoring mechanism and the second monitoring mechanism, wherein the control unit is structured to:
      determine a compensatory control term responsive to the output of the first monitoring mechanism;
      calculate a velocity of the machine at a reference location upon the machine, responsive to the output of the second monitoring mechanism and to the compensatory control term; and
      command a change to at least one of a ground speed and a travel direction of the machine responsive to the calculated velocity.

2. The machine of claim 1 wherein the ground engaging elements include a first ground engaging track and a second ground engaging track, and the second monitoring mechanism is structured to monitor speed of a least one of the first and second ground engaging tracks.

3. The machine of claim 2 wherein the compensatory control term includes a lever arm that varies based upon a location of the center of mass.

4. The machine of claim 3 further comprising a measurement unit coupled to the frame at the reference location and structured to produce an output indicative of at least one of a position, an orientation, or an acceleration, of the machine.

5. The machine of claim 4 wherein the measurement unit includes an inertial measurement unit (IMU).

6. The machine of claim 3 wherein the implement includes a mast pivotable relative to the frame between a raised, vertical position and a lowered, horizontal position so as to translate the center of mass in a generally fore-to-aft direction.

7. The machine of claim 6 wherein the mast includes a drill mast.

8. The machine of claim 2 wherein the control unit is further structured to determine a position of the machine responsive to the calculated velocity, and to energize or de-energize an actuator of the implement responsive to the determined position.

9. A navigation system for a machine comprising:
a first monitoring mechanism structured to couple with an implement of the machine movable between a first configuration and a second configuration relative to a frame of the machine and to produce an output indicative of the configuration of the implement, and wherein a location of a center of mass of the machine varies dependent upon the configuration of the implement;
a second monitoring mechanism structured to couple with ground engaging elements of the machine and to produce an output indicative of a speed of at least one of the ground engaging elements; and
a control unit coupled with the first monitoring mechanism and the second monitoring mechanism, the control unit structured to:
determine a compensatory control term responsive to the output of the first monitoring mechanism;
calculate a velocity of the machine at a reference location upon the machine responsive to the output of the second monitoring mechanism, and responsive to the compensatory control term; and
command a change to at least one of a ground speed and a travel direction of the machine responsive to the calculated velocity.

10. The navigation system of claim 9 wherein the compensatory control term includes a lever arm between the reference location and a track speed origin of the machine having a location dependent upon the location of the center of mass.

11. The system of claim 10 wherein the first monitoring mechanism includes track speed sensors structured to monitor speeds of first and second ground engaging tracks of the machine.

12. The system of claim 10 wherein the implement includes a movable arm and the first monitoring mechanism includes a position sensor structured to monitor a position of the implement relative to the frame.

13. The system of claim 10 further comprising a measurement unit structured to couple with the frame at the reference location and to produce an output indicative of at least one of a position, an orientation, or an acceleration of the machine.

14. The system of claim 13 wherein the measurement unit includes an inertial measurement unit (IMU).

15. The system of claim 9 wherein the control unit is further structured to calculate the velocity by way of compensating for lateral movement of the reference location during turning the machine.

16. The system of claim 15 wherein the control unit is further structured to determine a position of the machine responsive to the calculated velocity.

17. A method of navigating a machine comprising:
receiving data indicative of a speed of a ground engaging element of the machine;
receiving data indicative of a configuration of an implement of the machine movable relative to a frame of the machine such that a location of a center of mass of the machine is moved relative to the frame;
determining a control term responsive to the data indicative of configuration;
calculating a velocity of the machine responsive to the control term and to the data indicative of speed; and
commanding a change to at least one of a ground speed and a travel direction of the machine responsive to the calculated velocity.

18. The method of claim 17 wherein receiving data indicative of speed includes receiving data indicative of an average speed of first and second ground engaging tracks.

19. The method of claim 17 wherein calculating velocity further includes compensating for lateral movement of a reference location on the machine to a track speed origin having a location dependent upon the location of the center of mass.

20. The method of claim 19 wherein compensating further includes compensating for lateral movement of the reference location relative to the track speed origin during turning the machine.

* * * * *